United States Patent
Lee (10) Patent No.: US 12,214,693 B2
(45) Date of Patent: Feb. 4, 2025

(54) BATTERY SWAPPING STATION HAVING EMERGENCY POWER GENERATION FUNCTION

(71) Applicant: LG ENERGY SOLUTION, LTD., Seoul (KR)

(72) Inventor: Keun Wook Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/024,171

(22) PCT Filed: Aug. 1, 2022

(86) PCT No.: PCT/KR2022/011280
§ 371 (c)(1),
(2) Date: Mar. 1, 2023

(87) PCT Pub. No.: WO2023/048388
PCT Pub. Date: Mar. 30, 2023

(65) Prior Publication Data
US 2024/0300375 A1   Sep. 12, 2024

(30) Foreign Application Priority Data
Sep. 24, 2021  (KR) .......................... 10-2021-0126278

(51) Int. Cl.
*B60L 53/80*  (2019.01)
*B60L 3/00*   (2019.01)
(Continued)

(52) U.S. Cl.
CPC ............. *B60L 53/80* (2019.02); *B60L 3/0084* (2013.01); *B60L 53/20* (2019.02); *H02J 7/0045* (2013.01); *H02J 7/0047* (2013.01); *H02J 9/061* (2013.01); *B60L 2210/10* (2013.01); *B60L 2210/30* (2013.01); *B60L 2240/547* (2013.01); *H02J 2207/10* (2020.01); *H02J 2207/20* (2020.01)

(58) Field of Classification Search
CPC ........ B60L 53/80; B60L 53/20; B60L 3/0084; B60L 2210/10; B60L 2210/30; B60L 2240/547; H02J 7/0045; H02J 7/0047; H02J 9/061; H02J 2207/20; H02J 2207/10

See application file for complete search history.

(56) References Cited

U.S. PATENT DOCUMENTS 4,575,659 A * 3/1986 Pezzolo ................. H05B 47/11
315/159
2011/0248670 A1   10/2011 Yamazaki et al.
(Continued)

FOREIGN PATENT DOCUMENTS

CN   108808751 B   6/2021
JP   2005-238969 A   9/2005
(Continued)

*Primary Examiner* — Carlos Amaya
(74) *Attorney, Agent, or Firm* — Birch, Stewart, Kolasch & Birch, LLP (57) ABSTRACT

A battery swapping station includes an emergency power generation function capable of, when the supply of power to a battery swapping station (BSS) for charging a swappable battery is interrupted due to power failure or system error, enabling the BSS system to be operated without interruption.

11 Claims, 6 Drawing Sheets

(51) Int. Cl.
  B60L 53/20 (2019.01)
  H02J 7/00 (2006.01)
  H02J 9/06 (2006.01)

(56) References Cited

U.S. PATENT DOCUMENTS

| | | |
|---|---|---|
| 2013/0063079 A1 | 3/2013 | Kawai et al. |
| 2014/0203632 A1 | 7/2014 | Kouno et al. |
| 2015/0183332 A1 | 7/2015 | Yun et al. |
| 2016/0268822 A1 | 9/2016 | Toya |
| 2018/0260887 A1 | 9/2018 | Takatsuka et al. |
| 2019/0202416 A1 | 7/2019 | Lai et al. |
| 2019/0299942 A1* | 10/2019 | Shih .................. B60L 53/63 |
| 2021/0175724 A1* | 6/2021 | Chien .................. H02J 7/0013 |
| 2022/0126696 A1 | 4/2022 | Jeannard |

FOREIGN PATENT DOCUMENTS

| | | |
|---|---|---|
| JP | 2008-35674 A | 2/2008 |
| JP | 2009-17710 A | 1/2009 |
| JP | 2010-193540 A | 9/2010 |
| JP | 4702445 B2 | 6/2011 |
| JP | 2011-147308 A | 7/2011 |
| JP | 2013-62905 A | 4/2013 |
| JP | 2013-81290 A | 5/2013 |
| JP | 2014-225995 A | 12/2014 |
| JP | 2015-27135 A | 2/2015 |
| JP | 5872494 B2 | 3/2016 |
| JP | 2016-171061 A | 9/2016 |
| JP | 2017-91427 A | 5/2017 |
| JP | 2017-225342 A | 12/2017 |
| JP | 6331112 B2 | 5/2018 |
| JP | 2019-176725 A | 10/2019 |
| JP | 2020-77521 A | 5/2020 |
| JP | 6820905 B2 | 1/2021 |
| KR | 10-1409999 B1 | 6/2014 |
| KR | 10-2014-0086499 A | 7/2014 |
| KR | 10-1418181 B1 | 7/2014 |
| KR | 10-1528079 B1 | 6/2015 |
| KR | 10-2019-0114855 A | 10/2019 |
| KR | 10-2021-0075160 A | 6/2021 |

* cited by examiner

BATTERY SWAPPING STATION HAVING EMERGENCY POWER GENERATION FUNCTION

TECHNICAL FIELD

This application claims the benefit of priority to Korean Patent Application No. 2021-0126278 filed on Sep. 24, 2021, the disclosure of which is incorporated herein by reference in its entirety.

The present invention relates to a battery swapping station having an emergency power generation function. More particularly, the present invention relates to a battery swapping station having an emergency power generation function capable of, when the supply of power to a battery swapping station (BSS) configured to charge a swappable battery is interrupted due to power failure or system error, enabling the BSS system to be operated without interruption.

BACKGROUND ART

With movement to replace an internal combustion engine of a vehicle with an electric motor, much research on a method of supplying electricity, which is a resource of the electric motor, to the vehicle has been conducted. Typically, a scheme in which an electric battery is disposed in the vehicle and the electric motor uses electricity stored in the electric battery has been proposed.

Meanwhile, a scheme in which a battery of a vehicle is swapped to supply electrical energy to the vehicle, instead of charging the battery of the vehicle, due to the reason that time necessary to charge the battery is longer than time necessary to fill a vehicle using a conventional internal combustion engine with fuel has been proposed.

Conventionally, power generated by a fossil fuel power generation renewable energy power generation source of a system is supplied to a load and a battery swapping station. The power is supplied from the system to a load and a consumer through unidirectional power transmission.

The battery swapping station, which is a place at which a battery of an electric vehicle driven by electrical energy is swapped, includes a plurality of batteries capable of being swapped with the battery of the electric vehicle, and the battery is charged with power supplied from the system.

The battery provided in the battery swapping station is a battery for electric vehicles, which cannot store a large amount of power. Meanwhile, renewable energy power generation, such as fuel cell power generation, wind power generation, and photovoltaic power generation, is included in the system so as to supply generated power to the system. However, renewable energy power generation, such as wind power generation and photovoltaic power generation, is greatly affected by weather, whereby it is difficult to uniformly and continuously supply power to a load, and therefore usability is greatly reduced. In particular, for fuel cell power generation, when the system or a load is abnormal, whereby linkage is interrupted, it is not possible to maintain power generation, since power generation is possible only in a state of being linked to the load.

Such limitations lead to a limitation in operation of the system and the battery swapping station. Since the supply of power to the battery swapping station is achieved based on system linkage through an external power source using a smart grid, therefore, there is a limitation in stable operation of the battery swapping station in case of such as electrical emergency, disconnection from an external system.

In addition, since the battery included in the battery swapping station cannot be charged with a large amount of power, appropriate supply of power is difficult using only available power of the battery when the supply of power to the system is necessary.

Korean Registered Patent Publication No. 1528079 discloses a battery exchange station and a method of operating the battery exchange station, wherein a large-capacity battery is charged with power supplied from a system, the energy stored in the large-capacity battery is supplied to the system depending on the operation state of the system, whereby it is possible to improve operation of the system and electricity demand using the energy stored in the battery. However, technology related to operation of a battery swapping station having an emergency power generation function at the time of electrical disconnection from the system is not disclosed.

Korean Patent Application Publication No. 2021-0075160 discloses a power supply control system including a first power control device including two input units and at least two output units and a second power control device including two input units and at least two output units, wherein each of the power control devices is configured to be operated in an active mode or an insulation mode, the input units and the output units of the power control device are electrically connected to each other in the active mode, the input units and the output units of the power control device are electrically insulated from each other in the insulation mode, one of the power control devices is operated in the active mode, and the other power control device is operated in the insulation mode. However, technology related to a battery swapping station having an emergency power generation function that is capable of being stably operated at the time of abnormal supply of power due to electrical disconnection, as in the present invention, is not disclosed.

Korean Registered Patent Publication No. 1418181 discloses an energy storage system configured such that a user directly controls charging or discharging of a battery pack when a mode switching button is switched on, a microcomputer provided in the energy storage system determines whether power failure has occurred and the state of the battery pack to control charging or discharging of the battery pack when the mode switching button is switched off. However, technology related to a battery swapping station having an emergency power generation function is not disclosed.

Japanese Registered Patent Publication No. 5872494 discloses technology related to a power conversion apparatus for vehicles having a level converter and a resistor configured to prevent discharge of a protection circuit for overvoltage inhibition. However, technology related to a battery swapping station having an emergency power generation function is not disclosed.

Consequently, there is a need to propose a battery-pack-based battery swapping station having an emergency power generation function capable of improving operation between a system and the battery swapping station by solving the above limitations in an emergency situation in which the supply of power necessary to achieve various functions and effects of a smart grid is impossible at the time when a UPS configured to supply power to a load in an uninterrupted state, an electric vehicle, charging of the electric vehicle using a battery, bidirectional power transaction between a supplier who utilizes available power or surplus power and a consumer, and renewable energy power generation are emphasized as the result of replacing a conventional power grid with the smart grid.

PRIOR ART DOCUMENTS (Patent Document 1) Korean Registered Patent Publication No. 1528079
(Patent Document 2) Korean Patent Application Publication No. 2021-0075160
(Patent Document 3) Korean Registered Patent Publication No. 1418181
(Patent Document 4) Japanese Registered Patent Publication No. 5872494

DISCLOSURE

Technical Problem

The present invention has been made in view of the above problems, and it is an object of the present invention to provide a battery swapping station having an emergency power generation function capable of, when the supply of power to a battery swapping station (BSS) configured to charge a swappable battery is interrupted due to power failure or system error, enabling the BSS system to be operated without interruption.

Technical Solution

A battery swapping station having an emergency power generation function according to the present invention to accomplish the above object includes a housing, a charger disposed in the housing, a controller configured to control the charger, a battery pack swapping power source configured to supply power to the charger and/or the controller, and a power connector configured to allow the charger to be connected to a battery pack, wherein the controller includes a controller power source for driving, a processor configured to generate a control signal, and a communication connector configured to communicate with the charger and/or the battery pack, and when the supply of power from an external alternating current power source to the battery pack swapping power source is interrupted, whereby no power is supplied to the controller power source, the processor turns on a control switch to discharge power from the battery pack to the controller power source.

In addition, the control switch may be an external manipulation switch configured to be physically manipulated at the outside.

In addition, the control switch may be a timer switch configured to sense that no power is supplied to the controller power source independent of the processor and to discharge the battery pack after a predetermined time.

In addition, the charger may include at least one bidirectional DC/DC converter disposed in the housing, the bidirectional DC/DC converter being configured to supply direct current power to the battery pack.

In addition, the battery swapping station may include an AC/DC converter connected to the external alternating current power source, the AC/DC converter being configured to convert current.

In addition, the controller may be positioned between the AC/DC converter and the bidirectional DC/DC converter.

In addition, the battery swapping station may include a DC/DC converter positioned between the AC/DC converter, the bidirectional DC/DC converter, and the controller.

In addition, the timer switch may include a self-power source.

In addition, the controller may include a voltage sensing unit configured to determine whether voltage from the battery pack swapping power source and the controller power source is abnormal.

In addition, the present invention provides an electrically driven device including a receiving unit configured to receive identification information of the battery swapping station having the emergency power generation function and a central processing unit (CPU) configured to determine whether to communicate with the battery swapping station having the emergency power generation function based on the identification information received from the battery swapping station having the emergency power generation function and authentication information.

It is obvious that the type of the electrically driven device is not restricted as long as the electrically driven device is a device that secures driving power using a battery pack. Preferably, the electrically driven device is an electric vehicle, an electric motorcycle, or an electric cart.

Advantageous Effects

As is apparent from the above description, a battery swapping station having an emergency power generation function has an effect in that it is possible to stably maintain the operation of a battery pack even in an emergency situation in which the supply of power is interrupted.

In addition, the battery swapping station has an effect in that it is possible to maintain stable communication and swapping between an electric vehicle and the battery swapping station, whereby it is possible to maintain communication between the electric vehicle and the battery swapping station.

In addition, the battery swapping station has an effect in that a battery is charged with power and the power is resupplied to the battery swapping station, whereby it is possible to utilize the energy stored in the battery.

In addition, the battery swapping station has an effect in that it is possible to supply the energy stored in the battery to the battery swapping station when the operation of the system is changed, whereby it is possible to improve the operation of the system and electricity demand.

In addition, the battery swapping station has an effect in that power swapping is achieved between a system configured to supply power using the battery that stores power, a moving means configured to be charged with the power, and the station, whereby bidirectional supply of power between linked devices or systems is possible.

BEST MODE

Now, preferred embodiments of the present invention will be described in detail with reference to the accompanying drawings such that the preferred embodiments of the present invention be easily implemented by a person having ordinary skill in the art to which the present invention pertains.

In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations.

In the case in which one part is said to be connected to another part throughout the specification, not only may the one part be directly connected to the other part, but also, the one part may be indirectly connected to the other part via a further part.

In addition, that a certain element is included does not mean that other elements are excluded, but means that such elements may be further included unless mentioned otherwise.

Hereinafter, the present invention will be described in detail.

Figure 1:
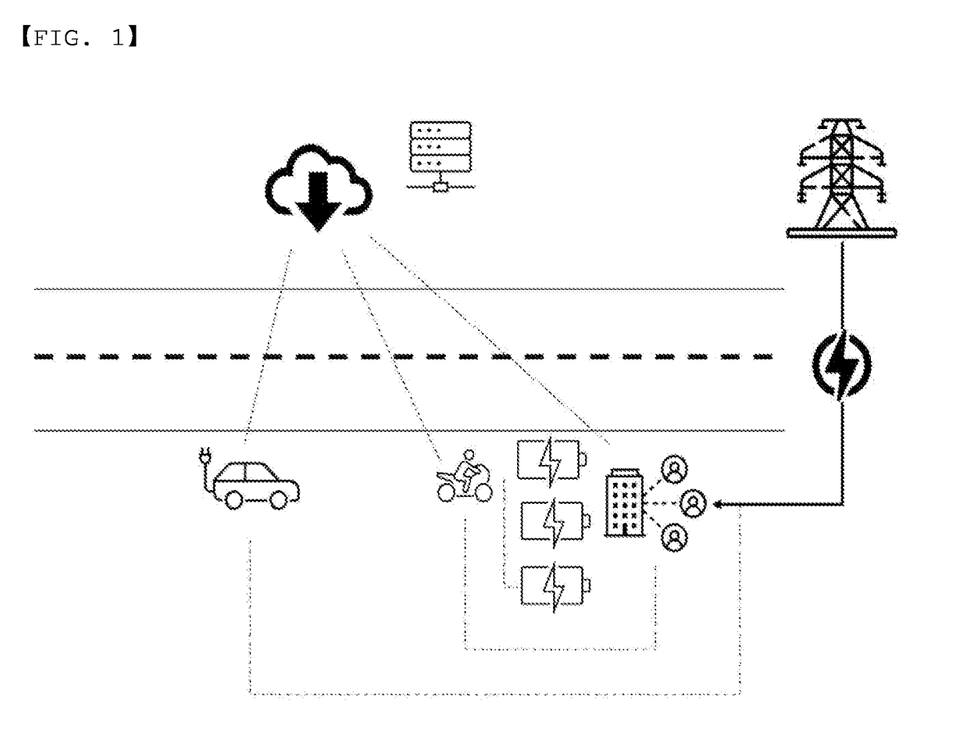
FIG. 1 is a conceptual view showing the operation of a battery swapping station for vehicles each driven by a battery pack.

FIG. 1 is a conceptual view showing the operation of a battery swapping station for vehicles each driven by a battery pack.

A battery swapping system for electric vehicles according to an embodiment includes a server, a battery swapping station, and an electric vehicle. The server may be an integrated control center. It is obvious that the kind of the electric vehicle is not restricted as long as the electric vehicle is an electrically driven device configured to be driven by an electric motor using current stored in an electric battery.

In the battery swapping system according to the embodiment, the server transmits information of a battery swapping station at which the electric vehicle can swap the battery to the electric vehicle. The electric vehicle performs battery swapping at a battery swapping station coinciding with the information of the battery swapping station received from the server. Hereinafter, a battery swapping station specified by the server as a station at which the electric vehicle will swap the battery is defined as a target battery swapping station. The server may set a station selected by a user of the electric vehicle as the target battery swapping station. Alternatively, the server may set a station closest to the electric vehicle as the target battery swapping station.

An external power source may have a power system line connected to the battery swapping station by wire. A power source configured to supply power to a power grid may be a conventional power generation source, preferably a renewable energy power generation source.

Referring to FIG. 1, in the battery swapping the communicate with each using a wireless other communication method as a communication method between system, the server and electric vehicle may respective objects. The server and the electric vehicle may communicate with each other using a wireless telecommunication method over a mobile communication network, such as 5G or LTE.

The server and the battery swapping station may communicate with each other using a wireless communication method, such as a wireless telecommunication method, or a wired communication method.

The battery swapping station and the electric vehicle may communicate with each other using a wireless communication method.

The battery swapping station includes a plurality of batteries constituted by a large-capacity battery for power storage only and a battery for swapping compatible with a battery of a moving means and a control unit MCU configured to control charging and discharging of the plurality of batteries such that the plurality of batteries is charged with power supplied from the system and such that the energy stored in the plurality of batteries is supplied to the system depending on the operation state of the system.

In an embodiment, each of the plurality of batteries may be a secondary battery, which is capable of being charged and discharged. The large-capacity battery may be any one of a redox flow battery, a NaS battery, and a compressed air energy storage (CAES) system, and the battery for swapping may be any one of a lithium-ion battery, a metal-air battery, and an Na-based battery.

When swapped with the battery for swapping, the battery of the moving means may be charged with power supplied from the system. The battery of the moving means may be charged with the energy stored in the plurality of batteries. In an embodiment, the battery of the moving means may be charged with power from the system, and the energy stored in the battery of the moving means may be supplied to the plurality of batteries and the system.

A power conversion apparatus configured to convert energy stored in the plurality of batteries by charging and power discharged from the plurality of batteries may be further included. In an embodiment, the power conversion apparatus may include a converter configured to convert AC power into DC power, an inverter configured to convert DC power into AC power, a switch, and a transformer configured to change the magnitude of voltage.

Figure 2:
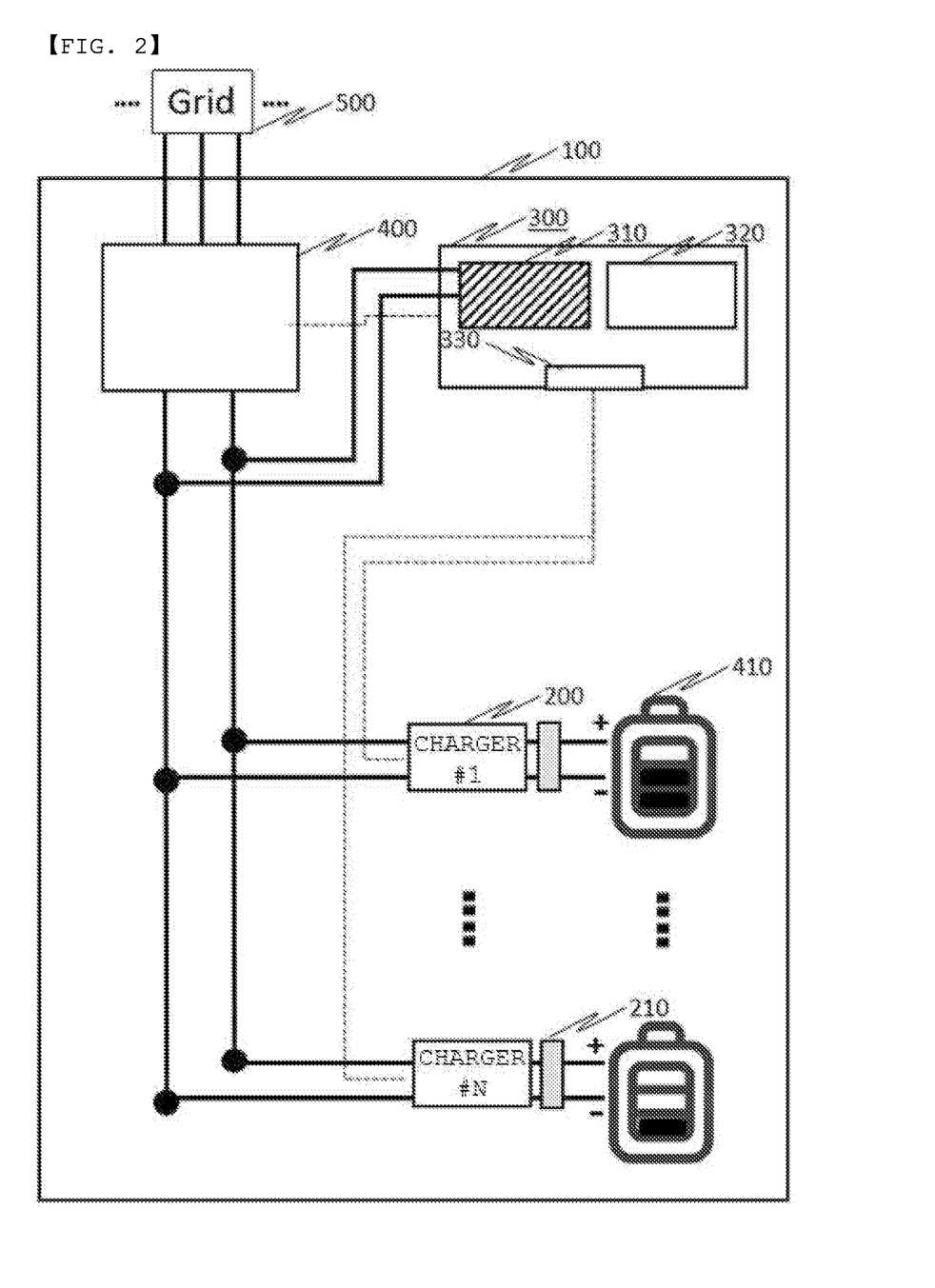
FIG. 2 is a view showing a conventional battery-pack-based battery swapping station based on power operation using an external alternating current power source.

FIG. 2 is a view showing a conventional battery-pack-based battery swapping station based on power operation using an external alternating current power source.

Referring to FIG. 2, a battery pack swapping power module of the battery swapping station generates DC power using power from the external alternating current power source, preferably power from an external power grid, applied thereto and supplies power to a controller and a charger.

A controller power module configured to manage driving power of the controller may be provided.

An energy storage system (ESS) may be constructed for an emergency situation in which no power is supplied from the external alternating current power source, such as power failure.

When the ESS is constructed, a battery and an inverter are additionally required in addition to conventional facilities, whereby manufacturing cost is increased and volume of the ESS is increased.

Figure 3:
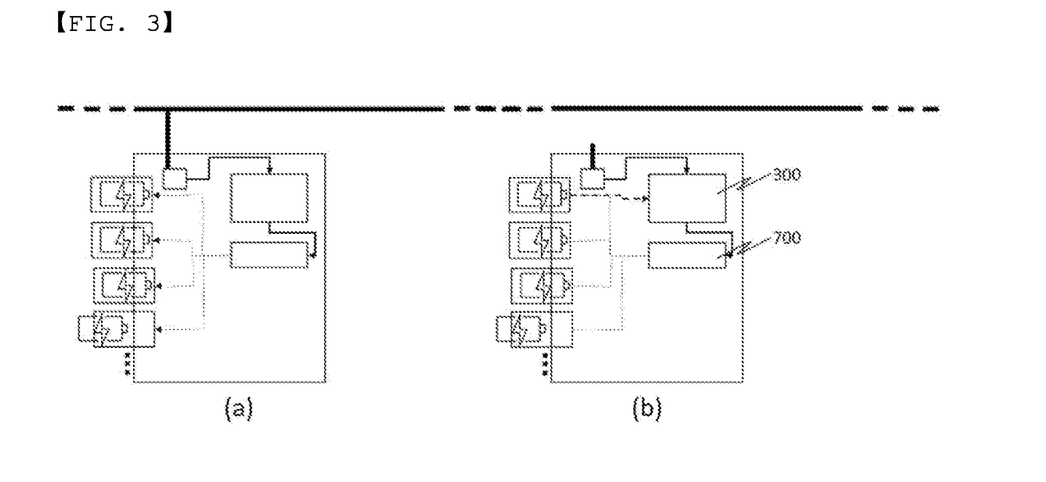
FIG. 3 is a view schematically showing the operation of a battery swapping station having an emergency power generation function according to an embodiment of the present invention when external power is normally supplied to the battery swapping station and when the supply of external power to the battery swapping station is interrupted.

FIG. 3 is a view schematically showing the operation of a battery-pack-based battery swapping station according to an embodiment of the present invention when external power is normally supplied to the battery swapping station and when the supply of external power to the battery swapping station is interrupted.

(a) of FIG. 3 is a view showing the situation in which power from an external power grid is normally supplied to the battery swapping station, and (b) of FIG. 3 is a view showing the situation in which power from the external power grid is not supplied to the battery swapping station.

When the supply of external power is interrupted, whereby there is no power in the system of the battery swapping station, as shown in (b), the MCU may supply power from at least one battery pack to the battery swapping station, as indicated by a dotted line.

Figure 4:
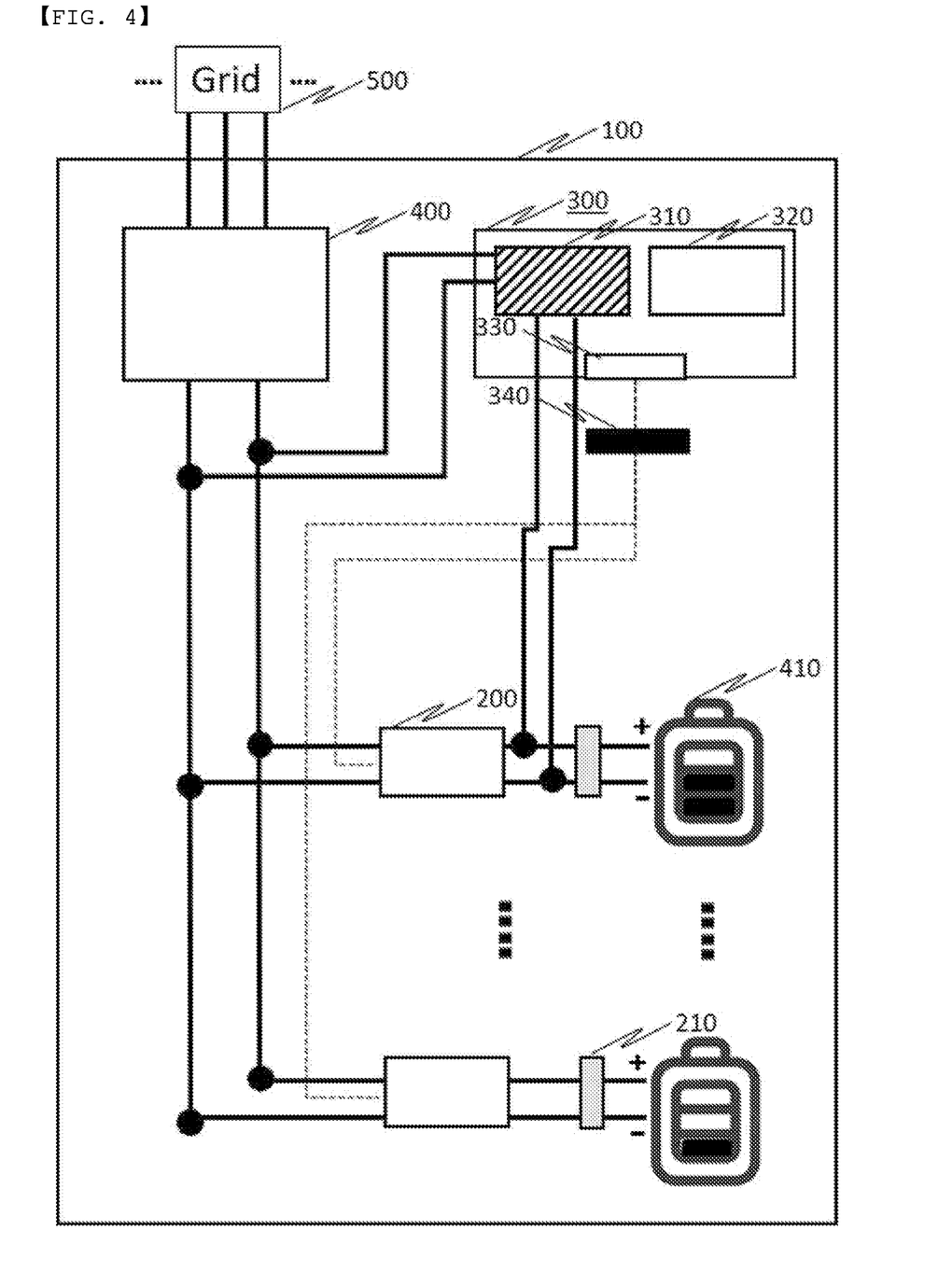
FIG. 4 is a view showing a battery swapping station having an emergency power generation function to which a control switch according to an embodiment of the present invention is applied.

FIG. 4 is a view showing a battery swapping station having an emergency power generation function to which a control switch according to an embodiment of the present invention is applied.

Embodiment 1

The battery swapping station according to the embodiment of the present invention is configured such that one charger is connected to each battery pack.

A battery pack swapping power module of the battery swapping station generates DC power using power from an external alternating current power source, preferably power from an external power grid, applied thereto and supplies the power to a controller and a charger.

A controller power module configured to manage driving power of the controller may be provided.

A positive electrode (+) and a negative electrode (−) of the battery pack may be connected to the controller, and the battery pack may be connected to the controller power module via the control switch. Only some of a plurality of battery packs may be connected to the controller power module, or all of the battery packs may be connected to the controller power module.

The control switch may be operated by a controller power source or a processor CPU in the controller.

The moment the supply of power from the battery pack swapping power source applied to the controller power module is interrupted as the supply of power from the external alternating current power source is interrupted due to power failure, the processor may sense the same and may turn on the switch.

At this time, discharging command may be transmitted to the battery pack such that the battery pack supplies power to the controller power source. The command may be transmitted through communication using an internal communication network, or the switch may directly transmit a signal.

Control logic of the battery swapping station is operated as follow. In a first step, the supply of AC power from the controller may be interrupted, and this may be sensed by the processor in the controller. When input voltage of the controller is decreased to a predetermined value or less, this may be sensed.

In a second step, a signal may be transmitted to turn on a discharging direction switch provided in one of the one or more battery packs.

The signal may be an internal communication signal or an analog signal.

In a third step, the switch may be turned on according to the signal.

The controller power may be maintained.

The switch may be configured to be directly operated by a worker outside.

Figure 5:
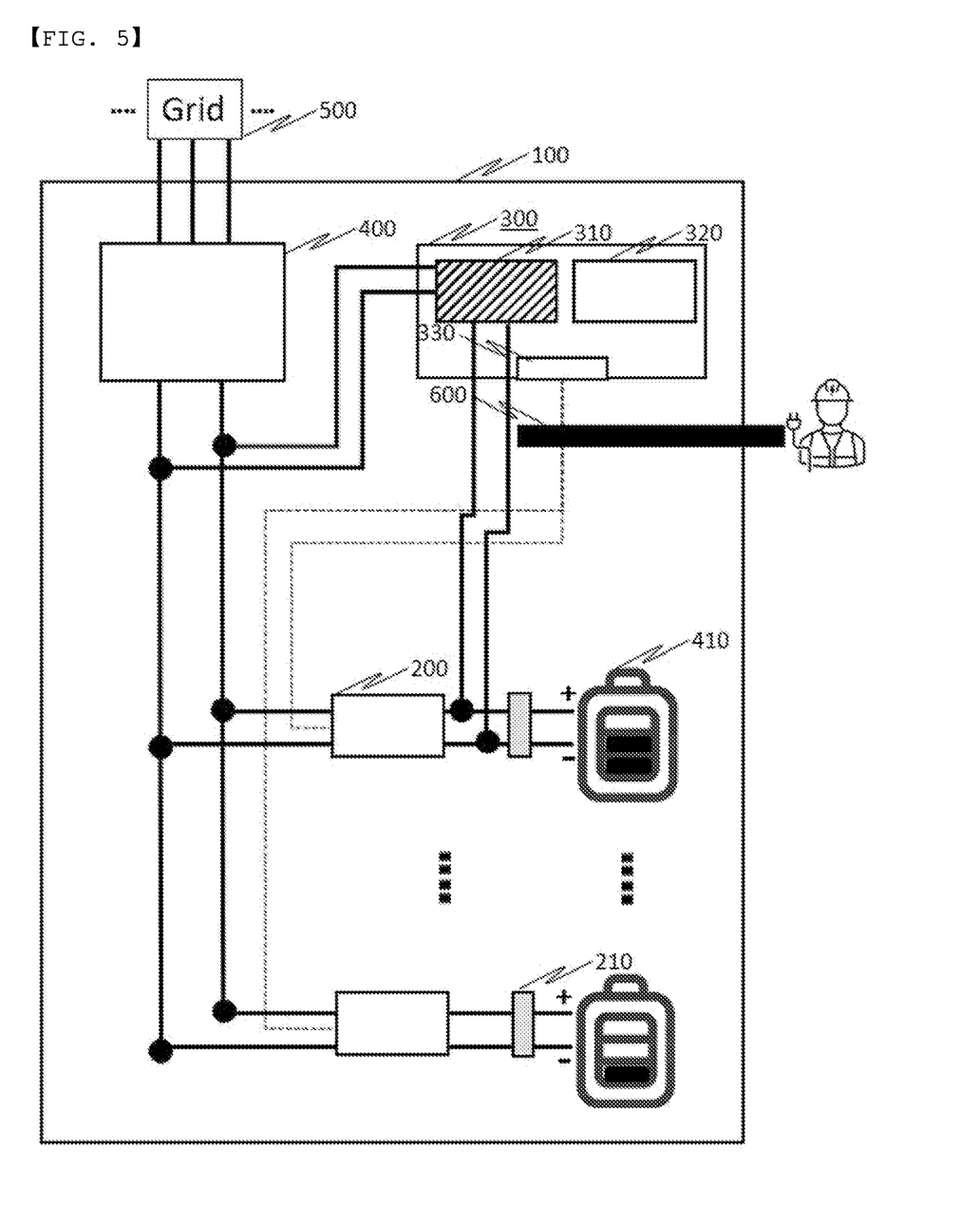
FIG. 5 is a view showing a battery swapping station having an emergency power generation function to which an external switch according to an embodiment of the present invention is applied.

FIG. 5 is a view showing a battery swapping station having an emergency power generation function to which an external switch according to an embodiment of the present invention is applied.

Embodiment 2

The battery swapping station according to the embodiment of the present invention is configured such that one charger is connected to each battery pack.

A battery pack swapping power module of the battery swapping station generates DC power using power from an external alternating current power source, preferably power from an external power grid, applied thereto and supplies the power to a controller and a charger.

A controller power module configured to manage driving power of the controller may be provided.

A positive electrode (+) and a negative electrode (−) of the battery pack may be connected to the controller, and the battery pack may be connected to the controller power module via the external switch.

Only some of a plurality of battery packs may be connected to the controller power module, or all of the battery packs may be connected to the controller power module.

The external switch may be configured to be directly operated by a worker outside.

In Embodiment 2, when alternating current power disappears due to power failure, the worker outside may manually manipulate the external switch.

The external switch may be operated such that the controller power source and the battery pack are connected to each other, and a discharging command may be transmitted to turn on a discharging switch of the battery pack.

The battery pack may be discharged according to the discharging command.

Control logic of the battery swapping station is operated as follow. In a first step, the supply of AC power from the controller may be interrupted and the operation of the controller may be terminated.

In a second step, a maintainer of the battery swapping station may visit the site as the operation of the controller is terminated.

In a third step, the external switch may be turned on and a signal may be transmitted to turn on a discharging direction switch provided in one of the one or more battery packs.

The signal may be an internal communication signal or an analog signal.

In the third step, the switch may be turned on according to the signal.

The controller power may be maintained.

Figure 6:
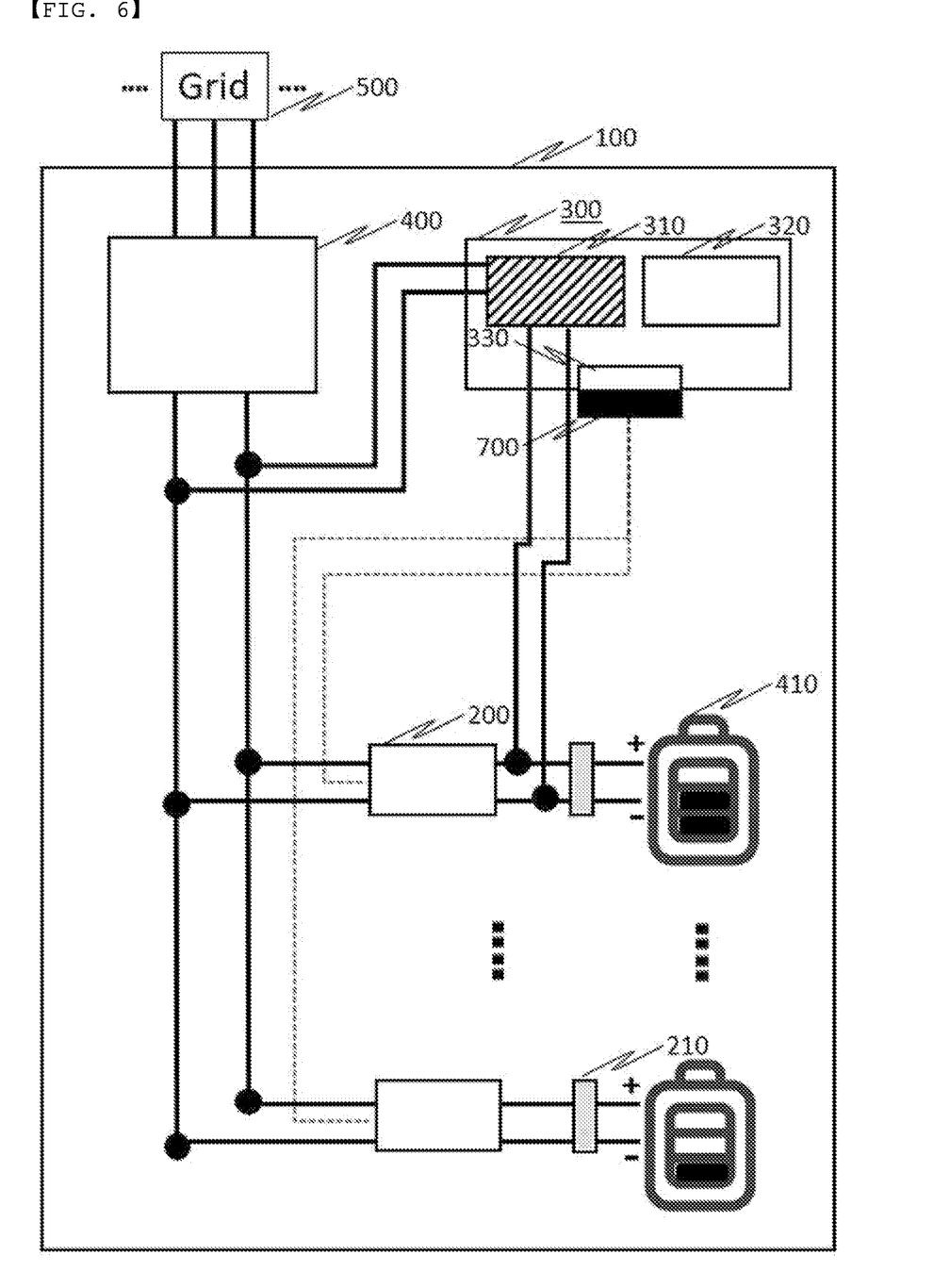
FIG. 6 is a view showing a battery swapping station having an emergency power generation function to which a timer switch according to an embodiment of the present invention is applied.

FIG. 6 is a view showing a battery swapping station having an emergency power generation function to which a timer switch according to an embodiment of the present invention is applied.

Embodiment 3

The battery swapping station according to the embodiment of the present invention is configured such that one charger is connected to each battery pack.

A battery pack swapping power module of the battery swapping station generates DC power using power from an external alternating current power source, preferably power from an external power grid, applied thereto and supplies the power to a controller and a charger.

A controller power module configured to manage driving power of the controller may be provided.

A positive electrode (+) and a negative electrode (−) of the battery pack may be connected to the controller, and the battery pack may be connected to the controller power module via the timer switch. Only some of a plurality of battery packs may be connected to the controller power module, or all of the battery packs may be connected to the controller power module.

The timer switch may include an energy storage device capable of supplying power by itself for a predetermined time.

The timer switch may be operated by a controller power source or a processor CPU in the controller.

When the supply of power from the battery pack swapping power source applied to the controller power module is interrupted as the supply of power from the external alternating current power source is interrupted due to power failure, the timer may transmit a discharging command to the battery pack such that the battery pack supplies power to the control power source after a predetermined time.

Control logic of the battery swapping station is operated as follow. In a first step, the supply of AC power from the controller may be interrupted and the operation of the controller may be terminated.

The timer recognizes that the output of control power has been turned off.

In a second step, a signal may be transmitted to turn on a discharging direction switch provided in one of the one or more battery packs after a predetermined time, preferably, after a few seconds.

The signal may be an internal communication signal or an analog signal.

In a third step, the timer switch may be turned on according to the signal.

The controller power may be maintained.

In addition, the controller may include a main control unit MCU formed between an AC/DC converter and a bidirectional DC/DC converter to a generate a control signal and a controller power source for driving.

When the battery of the moving means and the battery for swapping are swapped with each other, the battery for swapping included in the station is included in the moving means to substitute for the battery of the moving means, and the battery of the moving means is included in the station to substitute for the battery for swapping.

The battery of the moving means may be swapped with the battery for swapping through an automatic battery swapping device provided in the station or may be manually swapped with the battery for swapping.

When swapped with the battery for swapping, the battery of the moving means may be charged with power supplied from the system.

In addition, a first DC/DC converter formed between the AC/DC converter and the MCU may be included.

In addition, a second DC/DC converter formed between the MCU and the bidirectional DC/DC converter and the battery pack may be included.

In addition, when the supply of power from the external alternating current power source is interrupted, the MCU may operate the second DC/DC converter to change a current direction of the bidirectional DC/DC converter from the battery pack to the main power.

That is, when the battery of the moving means is included in the station as the result of swapping between the battery of the moving means and the battery for swapping, the battery of the moving means may substitute for the battery for swapping and may be charged with power supplied from the system.

The battery of the moving means that substitutes for the battery for swapping as the result of being included in the station as the battery of the moving means is swapped with the battery for swapping may be controlled by the control unit, in the same manner as the battery for swapping.

In addition, the battery of the moving means that substitutes for the battery for swapping as the result of being included in the station as the battery of the moving means is swapped with the battery for swapping may be discharged to supply the charged power to the system and may be swapped with a battery of another moving means.

In addition, the battery of the moving means may be charged with the energy stored in the plurality of batteries. That is, the battery of the moving means may not be swapped with the battery for swapping and may be charged with the energy stored in the plurality of batteries.

The energy stored in the battery for swapping is first supplied to the battery of the moving means. When it is difficult to charge the battery of the moving means with the energy stored in the battery for swapping, however, the energy stored in the large-capacity battery may be supplied.

The supply of power to the battery of the moving means may be achieved by the control unit controlling charging and discharging of the plurality of batteries.

In addition, a p-channel field-effect transistor (P-FET) formed between the second DC/DC converter and the bidirectional DC/DC converter and the battery pack may be included, and when the value of voltage sensed by the voltage sensing unit is 0 V, the controller may perform control such that the P-FET is turned on, whereby the second DC/DC converter is operated to change a current direction of the bidirectional DC/DC converter from the battery pack to the main power.

In addition, the present invention may provide an electrically driven device including a receiving unit configured to receive identification information of the battery-pack-based battery swapping station and a processor configured to determine whether to communicate with the battery-pack-based battery swapping station based on the identification information received from the battery-pack-based battery swapping station and authentication information.

The MCU may perform control such that, when load power of the system is equal to or greater than a predetermined level as the result of determining the operation state of the system of the battery swapping station, the energy stored in the plurality of batteries is supplied to the system, and when the load power of the system is less than the predetermined level, i.e. when charging of the plurality of batteries through the system is impossible or when operation of the battery swapping station is impossible, power necessary to operate the battery swapping station is supplied from one or more of the batteries.

In an embodiment, the MCU may define a time zone in which the load power of the battery swapping station is maximally consumed, which is a time zone in which power charged in the plurality of batteries is maximally required, as the result of determining the operation state of the battery swapping station as a peak time, may divide a period in which the load power is consumed for each time zone, and may specify the time zone in which the maximum load power has been consumed.

The battery swapping station and the electric vehicle may be connected to each other through short-range communication using Wi-Fi. When the electric vehicle reaches the battery swapping station, Wi-Fi mounted in the battery swapping station and Wi-Fi mounted in the electric vehicle may form a bridge type network.

As the battery swapping station and the electric vehicle are connected to each other through short-range communication, communication connection may be automatically achieved when the electric vehicle is located near the battery swapping station. To this end, the battery swapping station may provide a Wi-Fi network using a fixed local IP. The battery swapping station may open all ports so as to be connected to any electric vehicle. To this end, a DMZ may be set in the battery swapping station.

When the electric vehicle reaches the vicinity of the battery swapping station during driving, therefore, the electric vehicle may be connected to the battery swapping station through short-range communication based on Wi-Fi using a predetermined local fixed IP. For example, all battery swapping stations may be set so as to be connected to an external device through Wi-Fi using the same local fixed IP.

The electric vehicle may check whether the battery swapping station communicatively connected thereto coincides with a target battery swapping station for communication connection, and, when coincidence is achieved, may continuously communicatively connected to the connected battery swapping station.

If the battery swapping station communicatively connected to the electric vehicle does not coincide with a target battery swapping station for communication connection, however, the electric vehicle may perform communication connection with a target battery swapping station through the connected battery swapping station. The battery swapping station may inquire of the server about an IP address of each battery swapping station, and may set communication connection between the target battery swapping station and the electric vehicle based on the result of inquiry.

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and technical idea of the present invention, and it will be obvious that such changes and modifications fall within the scope of the appended claims.

DESCRIPTION OF REFERENCE NUMERALS

100: Housing
200: Charger
210: Power connector
300: Controller
310: Controller power source
320: Processor
330: Communication connector
340: Control switch
400: Battery pack swapping power source
410: Battery pack
500: External alternating current power source
600: External manipulation switch
700: Timer switch

The invention claimed is:

1. A battery swapping station having an emergency power generation function, the battery swapping station comprising:
 a housing;
 a charger disposed in the housing;
 a controller configured to control the charger;
 a battery pack swapping power source configured to supply power to the charger and/or the controller;
 a power connector configured to allow the charger to be connected to a battery pack; and
 a plurality of battery packs,
 wherein the controller comprises:
  a controller power source for driving;
  a processor configured to generate a control signal; and
  a communication connector configured to communicate with the charger and/or the battery pack,
 when a supply of power from an external alternating current power source to the battery pack swapping power source is interrupted, whereby no power is supplied to the controller power source, the processor turns on a control switch to discharge power from the battery pack to the controller power source, and
 wherein the plurality of battery packs include at least one battery configured only for power storage and configured to charge the controller power source when power is not supplied from the battery pack swapping power source to the controller power source.

2. The battery swapping station according to claim 1, wherein the control switch is an external manipulation switch configured to be physically manipulated at an outside.

3. The battery swapping station according to claim 1, wherein the control switch is a timer switch configured to sense that no power is supplied to the controller power source independent of the processor and to discharge the battery pack after a predetermined time.

4. The battery swapping station according to claim 1, wherein the charger comprises at least one bidirectional direct current to direct current (DC/DC) converter disposed in the housing, the bidirectional DC/DC converter being configured to supply direct current power to the battery pack.

5. The battery swapping station according to claim 4, comprising an alternating current to direct current (AC/DC) converter connected to the external alternating current power source, the AC/DC converter being configured to convert current.

6. The battery swapping station according to claim 5, wherein the controller is positioned between the AC/DC converter and the bidirectional DC/DC converter.

7. The battery swapping station according to claim 6, comprising a DC/DC converter positioned between the AC/DC converter, the bidirectional DC/DC converter, and the controller.

8. The battery swapping station according to claim 3, wherein the timer switch comprises a self-power source.

9. The battery swapping station according to claim 1, wherein the controller further comprises a voltage sensing unit configured to determine whether voltage from the battery pack swapping power source and the controller power source is abnormal.

10. An electrically driven device comprising:
 a receiving unit configured to receive identification information of the battery swapping station having the emergency power generation function according to claim 1; and
 a central processing unit (CPU) configured to determine whether to communicate with the battery swapping station based on the identification information received from the battery swapping station and authentication information.

11. A system comprising:
 the electrically driven device of claim 10; and
 the battery swapping station,
 wherein the electrically driven device and the battery swapping station communicate through a short-range communication, and wherein the battery swapping station transmits the identification information via a short-range communication channel.

\* \* \* \* \*